Sept. 20, 1971      K. KUSTER      3,605,506
DEVICE FOR OBTAINING A ROTATING MOTION WITH PERIODICALLY
ALTERNATING INCREASING AND DECREASING ANGULAR VELOCITY
Filed Sept. 23, 1969      4 Sheets-Sheet 1

INVENTOR:
KASPAR KUSTER
By: *Michael P. Bilz*
ATTORNEY

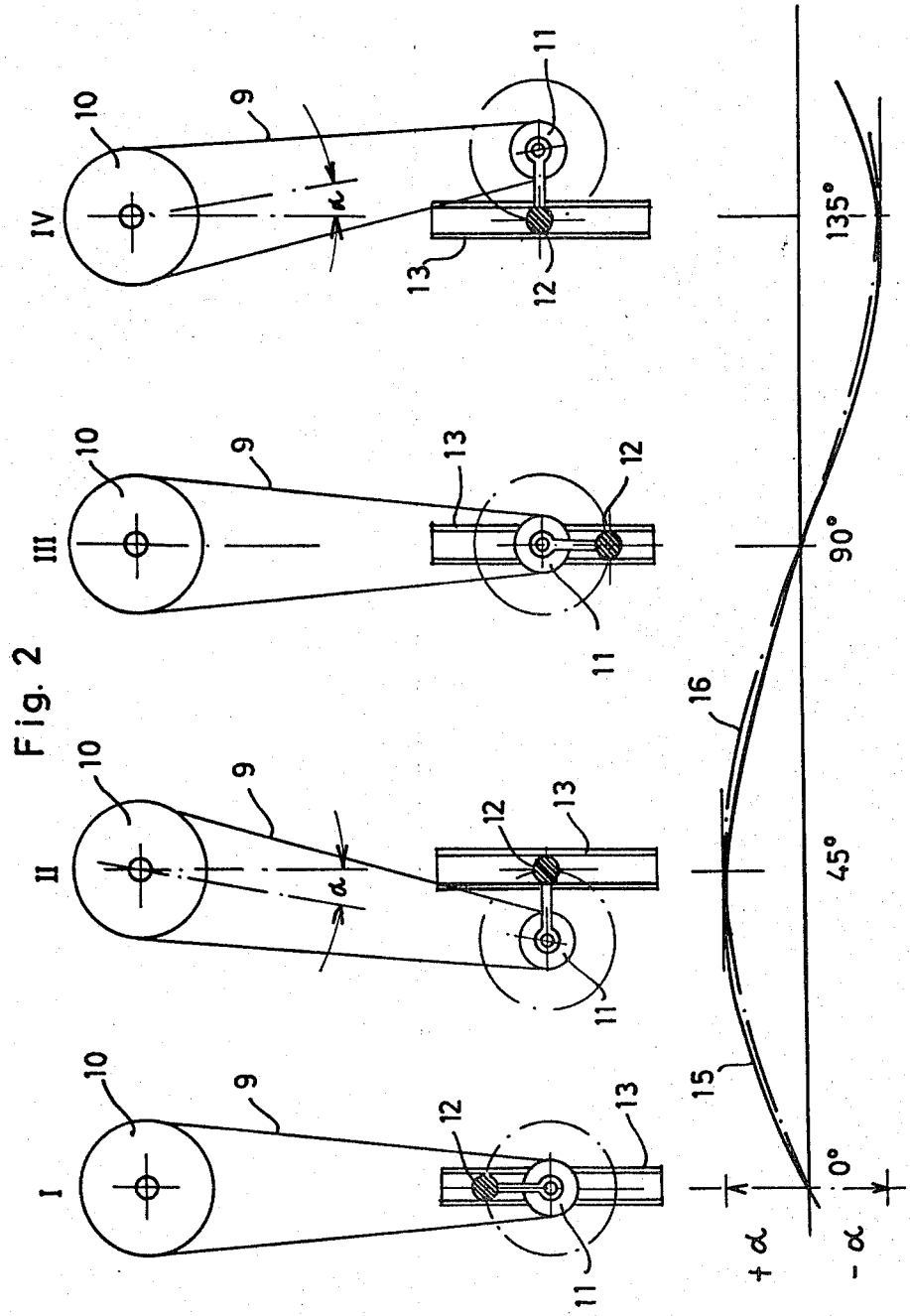

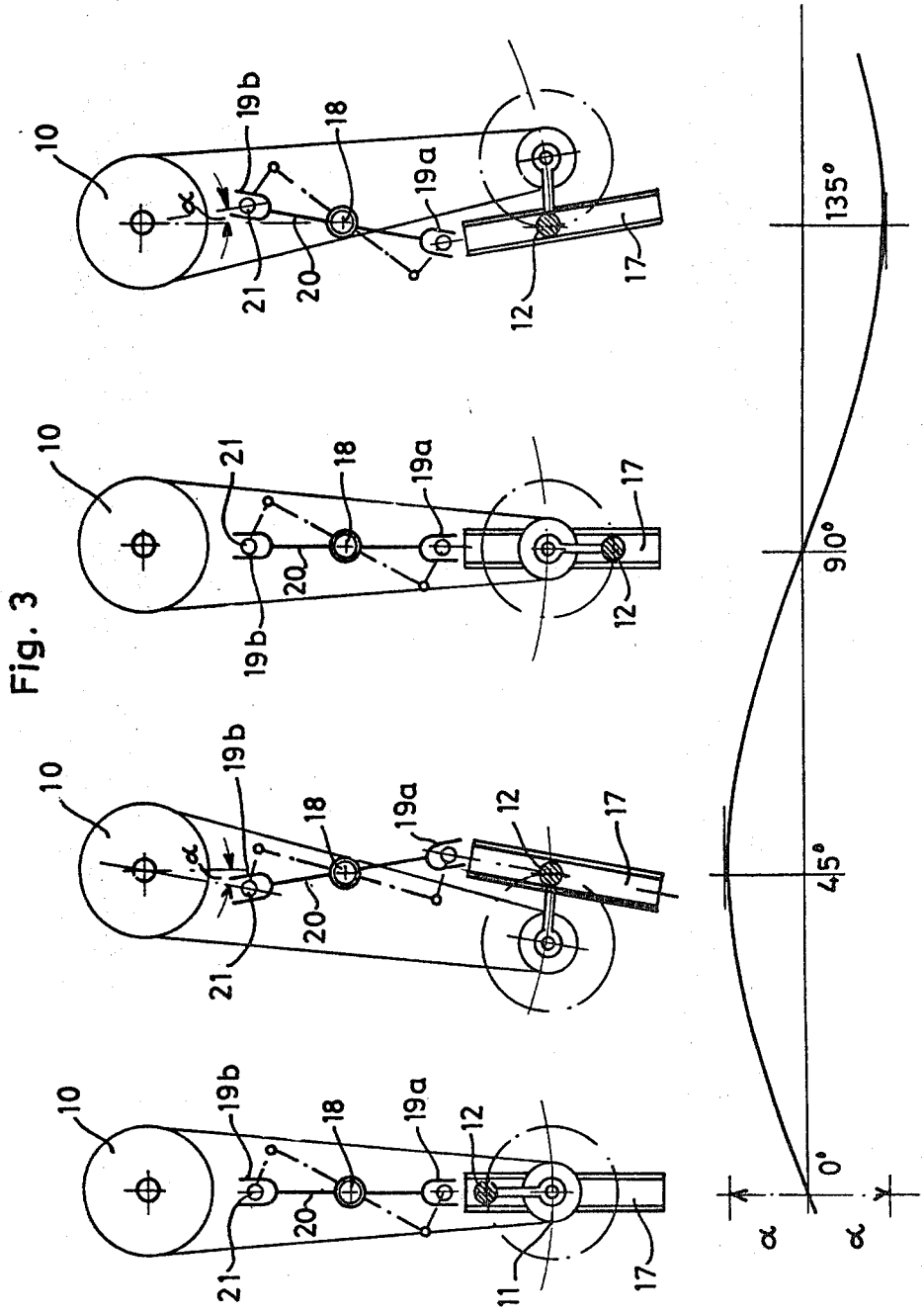

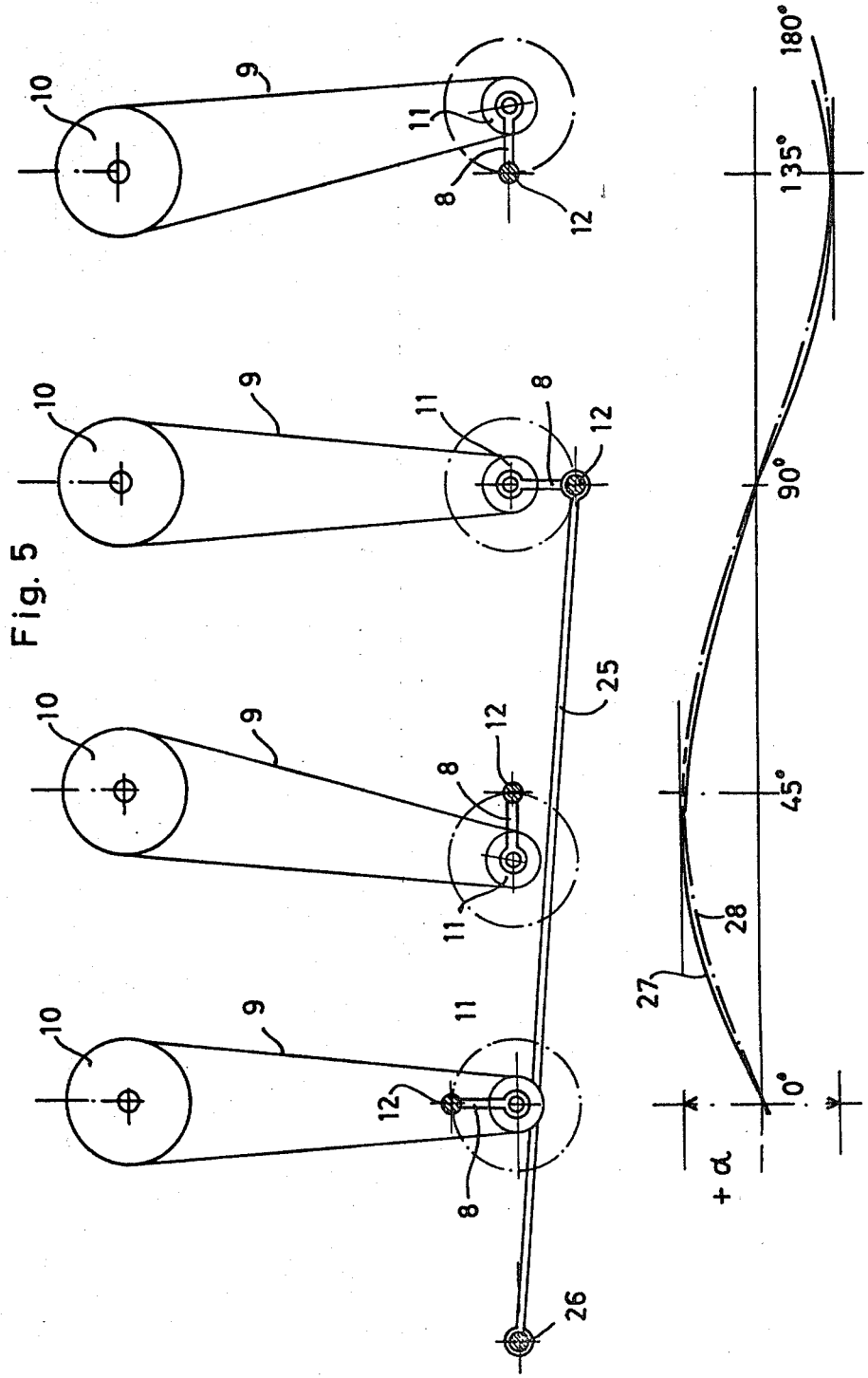

United States Patent Office 3,605,506
Patented Sept. 20, 1971

3,605,506
DEVICE FOR OBTAINING A ROTATING MOTION WITH PERIODICALLY ALTERNATING INCREASING AND DECREASING ANGULAR VELOCITY
Kaspar Kuster, Basel, Switzerland, assignor to Willy A. Bachofen, Basel, Switzerland
Filed Sept. 23, 1969, Ser. No. 860,327
Claims priority, application Switzerland, Sept. 23, 1968, 14,189/68
Int. Cl. F16h 21/12
U.S. Cl. 74—63                        6 Claims

ABSTRACT OF THE DISCLOSURE

A device for producing a rotating motion with periodically alternating increasing and decreasing angular velocity includes a pendulum pivotally mounted on a driven shaft of the device and carrying a control member which is positively coupled to the driven shaft and which cooperates with a fixed point of the device to cause a periodic swinging movement of the pendulum dependent on the speed of the driven shaft.

---

Drives with periodically rising and falling angular velocity are needed for the most varied purposes. For example, in the chemical industry there are agitating processes, the efficiency of which is considerably greater when using an agitator driven in this manner than with a conventional agitator rotating at a constant angular velocity.

A further field of application for such drives with periodically alternating angular velocity are the mechanisms for obtaining a tumbling and rotating motion (cf. for example the Swiss Pats. No. 216,760, 361,701 and 366,710). The peculiarity of such mechanisms consists in that the two auxiliary shafts to be driven have to rotate non-uniformly if an even distribution is to be obtained in the two accelerations and decelerations required alternately in the course of the movement. The devices existing hitherto for this purpose have relatively large space requirements, however; when universal joints are used, the whole torque is transmitted through these universal joints arranged at an angle and these are therefore soon deflected and detract from the accuracy as well as the life of the drive.

The device according to the invention overcomes these disadvantages in that mounted on the driven shaft of this device there is a pendulum which is pivotally connected thereto and on which there is a control member which is positively coupled to the driven shaft and which, cooperating with at least one fixed point of the device, produces a periodic swinging motion of the pendulum taking place depending on the speed of the driven shaft.

In a preferred embodiment, said control member is a crank mounted for rotation on the pendulum. In this case, the free pin of the crank is preferably guided in a stationary guide member which is mounted in front of the axis of symmetry of the pendulum motion and the longitudinal axis of which passes through the axis of rotation of the pendulum.

The chankpin may, however, also be connected to a fixed point of rotation through a connecting rod. The control member may also be constructed in the form of a camplate which is held in constant contact with a guideway through a resilient member.

Furthermore, the chankpin could be guided in a guide member which in turn is guided by a linkage which is constructed in the form of an equal-armed lever, pivotable about a fixed point, in such a manner that the longitudinal axis of the guide member always extends parallel to the longitudinal axis of the pendulum.

Some examples of embodiments of the subject of the invention are illustrated in the accompanying drawing.

FIG. 2 shows the same device in four different working phases with the associated characteristic kinetic curve and FIGS. 3 to 5 show further structural variations of the device.

Figure 1:
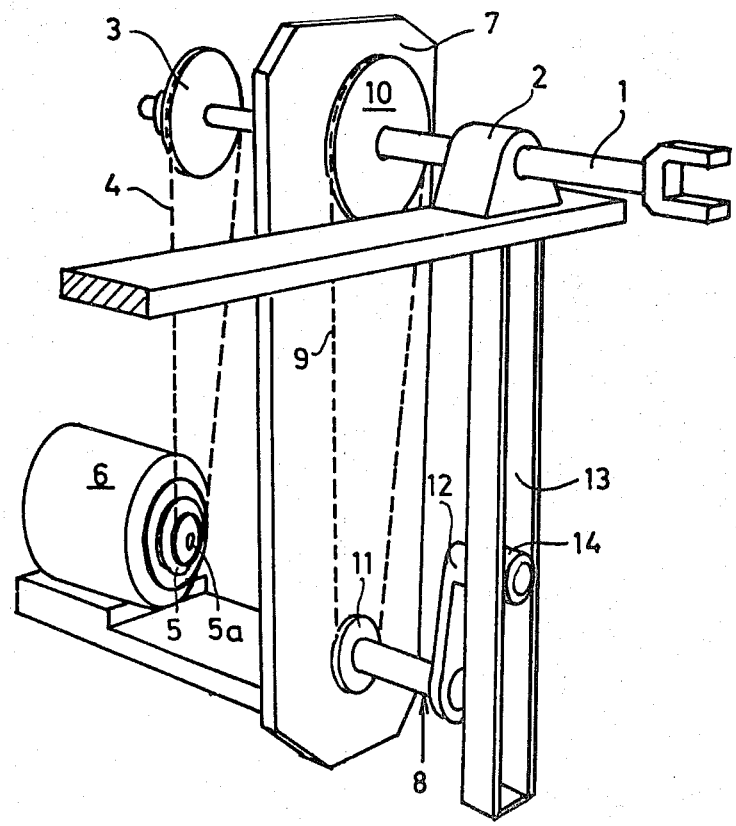
FIG. 1 shows a drive device which can be used to drive a mechanisms for producing a tumbling and rotating motion, illustrated simplified and in perspective.

In FIG. 1, one of the two drive shafts of a mechanism such as is described for example in the Swiss Pat. No. 216,760, is designated by 1. Thus the shaft 1 is the driven shaft of the device illustrated in FIG. 1. This driven shaft is mounted for rotation in a stationary bearing block 2 and carries, on its rear, overhung portion, a cone pulley 3 which is connected to the driven pulley 5 or the driven shaft 5a of a motor 6, through a driven belt 4.

Secured for swinging on the driven shaft 1 is a pendulum plate 7. A crank 8 is mounted for rotation in the lower, free portion of the pendulum plate 7. The drive of this crank is effected positively through a drive belt 9 which connects a pulley 10 mounted on the driven shaft 1 to the driven pulley 11 of the crank. The diameters of the pulleys 10 and 11 are so adapted to one another in the present case that the crank 8 is driven at half the speed of the driven shaft 1.

The crankpin 12 projects into the rectilinear, vertical slot in a guide section 13 which is mounted in front of the pendulum plate 7 and the longitudinal axis of which extends through the axis of the driven shaft 1. The pin 12 carries a ball bearing 14 in the region of the guide section 13.

If the driven shaft 1 is driven by the shaft 5a of the motor at a constant angular velocity, then the crank 8 also rotates with this—through the belt 9—at the speed ratio 2:1. On each revolution of the driven shaft 1, therefore, the pendulum will execute two complete movements to-and-fro. In the course of this, when the pendulum is moving in the direction of rotation of the driven shaft 1, acceleration occurs through superimposition (addition) of the two rotary movements; when the pendulum is swung in the opposite direction, on the other hand, the angular velocity of the driven shaft is reduced accordingly.

FIG. 2 shows the pendulum 7 in four positions I to IV which are each turned through 90° in relation to one another, the pendulum deflections being entered below these in angular degrees over the angle of rotation of the driven shaft 1. The resulting curve 15 is somewhat distorted in comparison with the ideal sine curve 16 because the guide 13 constantly alters its angular position in relation to the axis of the pendulum.

In order to obtain a precise sine curve, the guideway would have to extend parallel to the longitudinal axis of the pendulum at every moment. Fundamentally, such a form of construction is possible and will be demonstrated below with reference to a further embodiment.

FIG. 3 shows a drive device with the belt pulleys 10/11, the belt 9 and a rectilinear guide section 17, again in diagrammatic form, in four successive positions. In contrast to the embodiment shown in FIGS. 1 and 2, however, the guide section here is not secured rigidly but connected to a fixed pivot point 18 through articulated guide members. The guide members comprise a fork 19a acting on the guide section 17, a connecting rod 20 pivotally mounted at the pivot point 18, and a second fork 19b which is mounted for pivoting about a point 21 provided in the axis of symmetry of the pendulum motion. The linkage consisting of the parts 18, 19 and 20 forms an equal-armed lever with the fulcrum at 18. As a result of this arrangement, the longitudinal axis of the guide section 17 always remains parallel to the longitudinal axis of the pendulum as a result of which it becomes possible to obtain the sine curve illustrated in the lower part of FIG. 3.

Figure 4:
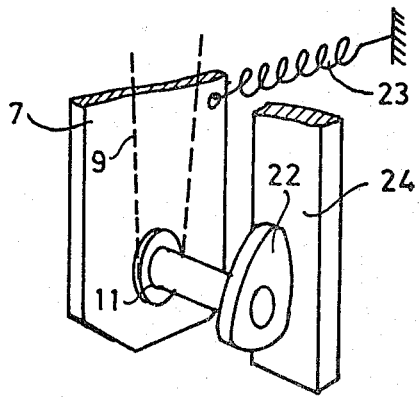

The control member, through which the rotary motion derived from the driven shaft 1 itself is converted into a reciprocating motion of the pendulum 7 does not, of course, necessarily have to be constructed in the form of a crank. FIG. 4, for example, shows how a camplate 22 can easily be mounted on the lower portion of the pendulum 7 and be set in rotation by the driven shaft 1 through the belt 9 and the belt pulley 11. The camplate 22 is held in constant contact with a stationary guideway 24 through a tension spring 23 so that the pendulum 7 necessarily executes a reciprocating motion during the rotation of the camplate 22. In this case, a correction of the characteristic kinetic curve in the sense of matching the ideal sine curve can be achieved by the selection of the shape of the camplate.

A further modification in design is illustrated in FIG. 5, the same reference numerals again being used for the parts corresponding to the previous examples. In this case, as in FIGS. 1 and 2, a cranks 8 is used which is mounted on the lower portion of the pendulum. Here, however, the crankpin 12 is connected to a fixed pivot point 26 through a connecting rod 25. On rotation of the crank 8, there is thus likewise a reciprocating motion of the pendulum.

As the characteristic kinetic curve 27 illustrated in the lower portion of FIG. 4 shows, this likewise differs somewhat from the ideal sine shape 28 but this can easily be accepted for many practical fields of application.

What is claimed is:

1. A device for obtaining a rotating motion with periodically alternating increasing and decreasing angular velocity, characterised in that, mounted on the driven shaft (1) of this device is a pendulum (7) which is pivotally connected thereto and on which there is a control member (8, 22) which is positively coupled to the driven shaft (1) and which, in cooperation with at least one fixed point of the device, causes a periodic swinging movement of the pendulum (7) effected depending on the speed of the driven shaft (1).

2. A device as claimed in claim 1, characterised in that said control member is a crank (8) mounted for rotation on the pendulum.

3. A device as claimed in claim 2, characterised in that free pin (12) of the crank (8) is guided rectilineraly in a stationary guide member (13) which is mounted in front of the axis of symmetry of the pendulum motion and the longitudinal axis of which passes through the axis about which the pendulum swings.

4. A device as claimed in claim 2, characterised in that the crank pin (12) is connected to a fixed point of rotation (26) through a connecting rod (25).

5. A device as claimed in claim 1, characterised in that the control member is a camplate (22) which is held in constant contact with a guideway (24) through a resilient member (23).

6. A device as claimed in claim 2, characterised in that the crank pin (12) is guided in a guide member (17) which in turn is guided by a linkage (18, 19, 20) which is constructed in the form of an equal-armed lever and is rotatable about a fixed point (21) in such a manner that the longitudinal axis of the guide member always extends parallel to the longitudinal axis of the pendulum.

References Cited

UNITED STATES PATENTS

| | | | |
|---|---|---|---|
| 176,036 | 4/1876 | Myers | 74—63 |
| 477,191 | 6/1892 | Westgate | 74—63 |

FOREIGN PATENTS

| | | | |
|---|---|---|---|
| 495,024 | 6/1954 | Italy | 74—63 |

WILLIAM F. O'DEA, Primary Examiner

W. S. RATLIFF, JR., Assistant Examiner